2,919,263
Patented Dec. 29, 1959

2,919,263

PROCESS FOR THE PREPARATION OF HIGH MOLECULAR WEIGHT FLUORINE COMPOUNDS

Karl-Heinz Kahrs, Hans Helmut Frey, Otto Scherer, and Helmut Hahn, Frankfurt am Main, Germany, assignors to Farbwerke Hoechst Aktiengesellschaft vormals Meister Lucius & Brüning, Frankfurt am Main, Germany, a corporation of Germany No Drawing. Application June 9, 1955
Serial No. 514,376

Claims priority, application Germany July 14, 1954

3 Claims. (Cl. 260—87.5)

The high molecular weight polymers containing fluorine gain increasing importance as plastics, owing especially to their good chemical and thermal stability and their excellent electrical data.

The mechanical properties are, however, still unsatisfactory for many purposes.

Thus, for example, the flexibility of high molecular weight polytrifluoro chloroethene is not sufficient for many purposes and it is often necessary because of this to improve this by the addition of plasticizers (for example, normally liquid trifluorochloroethene polymers). The use of plasticifiers, however, brings disadvantages. The plasticizer can be extracted by numerous organic solvents; i.e., the resistance of the plasticized product to chemicals is poorer than that of the initial polymer. Further, the plasticizer tends to evaporate on prolonged storage at elevated temperature, for example 100° C., so that the flexibility deteriorates.

It has been found now that one can obtain polymers with the greater flexibility desired by copolymerization of ethylene compounds containing fluorine, or fluorine and another halogen, and propene compounds containing fluorine and also another halogen or hydrogen. These copolymers do not show the disadvantages mentioned for the plasticized products. Surprisingly, even very small amounts of propene copolymer components are often sufficient in order to vary the properties of the plastic in the direction desired, as, for example, according to the following table:

| NST Value (° C.) | Spec. Viscosity | Max. Tensile Strength (kg./cm.²) | Elongation | Shore Hardness, Type D |
|---|---|---|---|---|
| Homopolymeric polytrifluorochloroethylene | | | | |
| 300–320° | 1.3–1.1 | 400–430 | 12–15 | 76 |
| Trifluorochloroethylene copolymerized with 2 weight percent trifluoropropylene (solid copolymer) | | | | |
| 304° | 1.2–1.4 | 330 | 147 | 71 |

For example, trifluorochloroethene can be copolymerized with trifluoropropene in the weight ratio of 97/3 to 99.9/0.1 without a resulting visible loss in thermal or chemical stability.

As the ethylene compound containing fluorine, which constitutes the principal monomer, may be mentioned, for example, trifluorochloroethylene, vinyl fluoride, vinylidene fluoride, trifluoroethylene, tetrafluoroethylene, etc.

As the co-component propene containing fluorine and another halogen or hydrogen; hydrogen and fluorine; as chlorine and fluorine; bromine and fluorine; hydrogen, chlorine and fluorine, or hydrogen, bromine, fluorine may be considered, for example 1,1,1-trifluoropropene-2

$(CF_3-CH=CH_2)$, monochloropentafluoropropene-2 $(CF_2Cl-CF=CF_2)$, monobromopentafluoropropene-2 $(CF_2Br-CF=CF_2)$, etc.

The copolymers can be prepared batchwise or continuously in block, solution, aqueous emulsion, or suspension.

The reaction temperatures lie between about −20° and +50° C. The polymerization can be carried out at the total vapor pressure of the monomers or at elevated pressure up to 2000 atmospheres in excess of the vapor pressure of the monomer.

Peroxide compounds, as hydrogen peroxide, benzoyl peroxide, monochlorobenzoyl peroxide, acetyl peroxide, lauroyl peroxide, etc., can be used as promoters or catalysts, and also the persulfates, the percarbonates, the azo compounds, such as alpha,alpha-azodiisobutyronitrile, alpha,alpha-azodiisobutryamide, etc.

The metal-redox catalysis recipe exhibits a particularly favorable activity in aqueous suspension or emulsion, in which, for example, potassium persulfate or ammonium persulfate together with reducing agents as, for example, sodium sulfate or sodium bisulfite are used with the addition of small amounts of water soluble salts of metals, which occur in a plurality of valence stages, such as copper.

The pH of the aqueous suspension can lie in the range of pH=2 to pH=10, while the additions of, for example, secondary and primary sodium phosphate, borax, succinic acid, etc., may suitably be used with it as a buffer substance for the maintenance of the pH.

Example

A 5-liter enameled autoclave, after thorough sweeping out with nitrogen and applying a vacuum between about 1 and 100 mm. mercury, is charged as follows: 2700 cc. distilled water boiled to expel gases; 5 grams of sodium bisulfite; 30 grams of disodiumhydrophosphate $(Na_2HPO_4 \cdot 2H_2O)$ and is then heated to 30° C. Thereafter (1) 20 grams 1,1,1-trifluoropropene $(CF_3-CH=CH_2)$ and (2) 980 grams trifluoromonochloroethene $(CF_2=CFCl)$ are included in this sequence and the following catalyst solution is forced in continuously under nitrogen excess pressure:

300 cc. distilled water, boiled to expel gases,
5.5 grams ammonium persulfate,
0.080 gram copper sulfate $(CuSO_4 \cdot 5H_2O)$.

The pressure amounts to 7.3 atmospheres. After 5 hours' running time a fall in pressure occurs, whereupon the gas is released.

The resultant slurry is precipitated with 2.5 liters 10 percent sodium chloride solution, filtered off, washed with hot distilled water until free of electrolytes and dried 48 hours at 130° C. The resultant product can be worked up to films or foils, for example, in which the included 1,1,1-trifluoropropene was identified by infrared spectroscopy.

Yield: 800 grams of colorless powder with a tapped density of 0.85 and an NST value of 293° C., as well as a specific viscosity of 1.2 (measured at 130° C. in 2,4-dichlorobenzotrifluoride).

We claim:
1. A process for the manufacture of a high molecular weight polymer containing fluorine which comprises polymerizing, as substantially the sole monomeric components of the reaction, trifluorochloroethylene in the presence of 1,1,1-trifluoropropene at a temperature between −20 and 50° C. in the presence of a peroxide polymerization promoter, the weight ratio of trifluorochloroethylene to trifluoropropene being between about 97:3 to 99.9:0.1.

2. A copolymer of trifluorochloroethylene and between about 0.1 and about 3 weight percent of 1,1,1-trifluoropropene.

3. A copolymer of trifluorochloroethylene and a minor amount of 1,1,1-trifluoropropene.

References Cited in the file of this patent

UNITED STATES PATENTS

| | | |
|---|---|---|
| 2,468,664 | Hanford et al. | Apr. 26, 1949 |
| 2,484,530 | Schroeder | Oct. 11, 1949 |
| 2,549,935 | Sauer | Apr. 24, 1951 |
| 2,598,283 | Miller | May 27, 1952 |
| 2,626,252 | Tawney | Jan. 20, 1953 |
| 2,689,241 | Dittman et al. | Sept. 14, 1954 |
| 2,705,706 | Dittman et al. | Apr. 5, 1955 |